Nov. 20, 1962 A. C. HOOF 3,064,992
UTILITY CARTS WITH ARTICLE SUPPORTING RACKS
Filed March 31, 1960 2 Sheets-Sheet 1
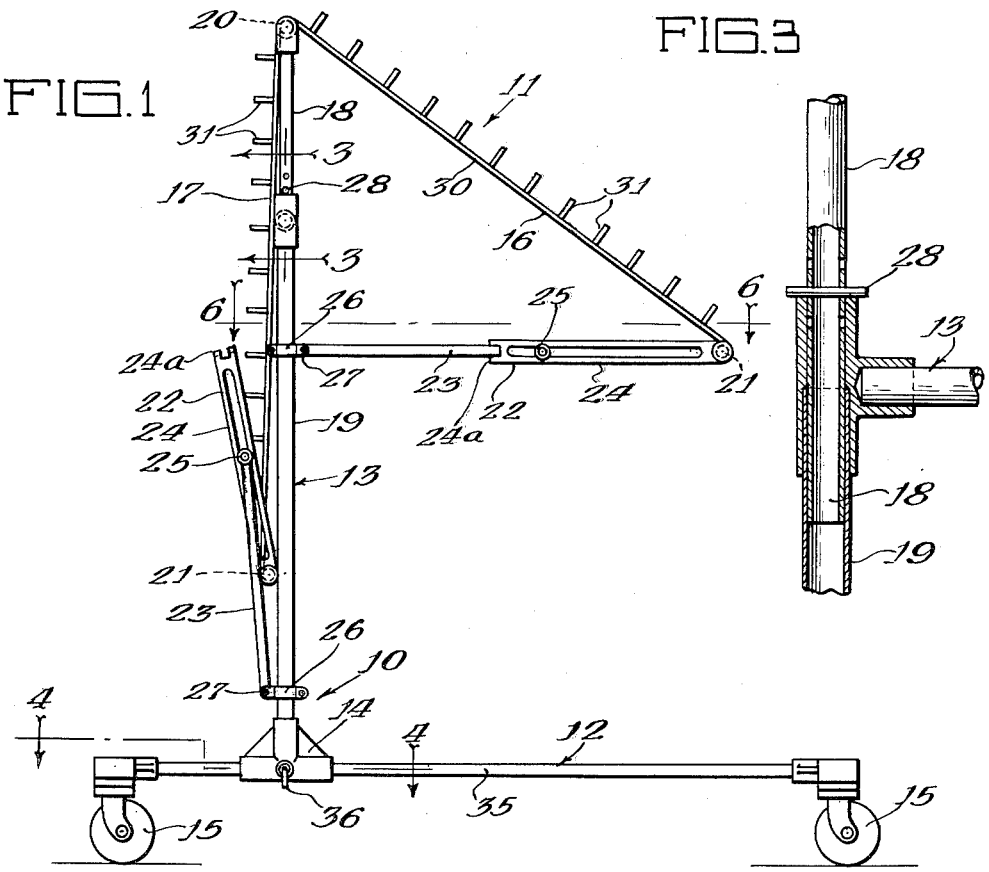
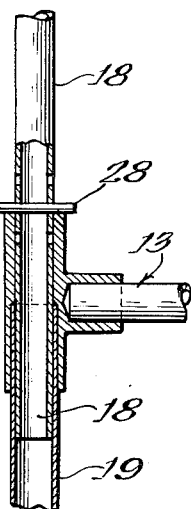
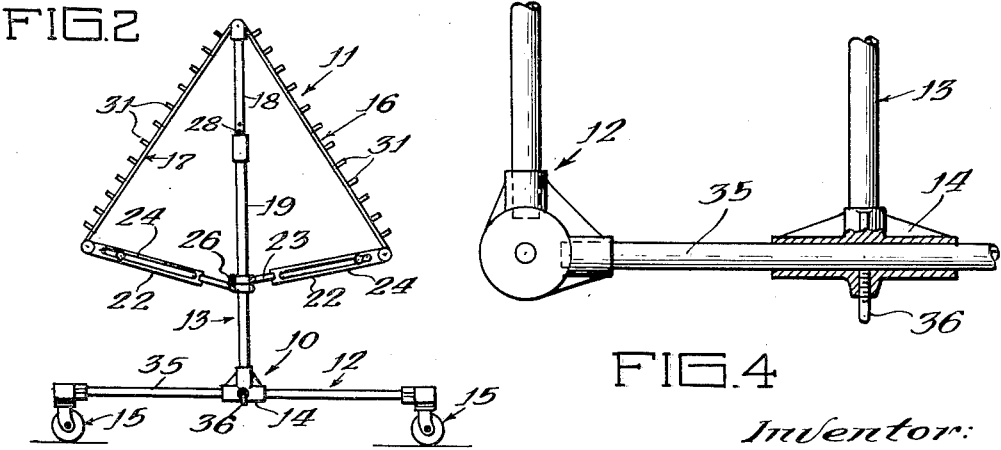
Inventor:
Addison C. Hoof
By: Zabel, Baker, York,
Jones & Dithmar
Attorneys Nov. 20, 1962 A. C. HOOF 3,064,992
UTILITY CARTS WITH ARTICLE SUPPORTING RACKS
Filed March 31, 1960 2 Sheets-Sheet 2
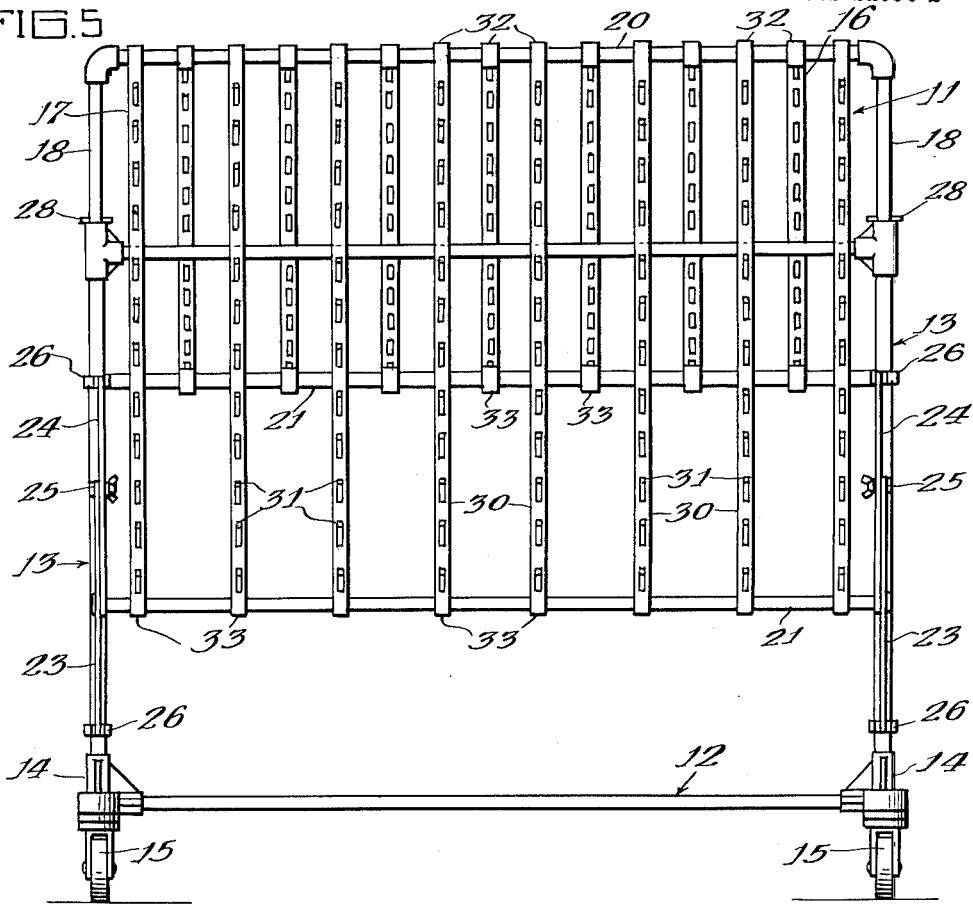
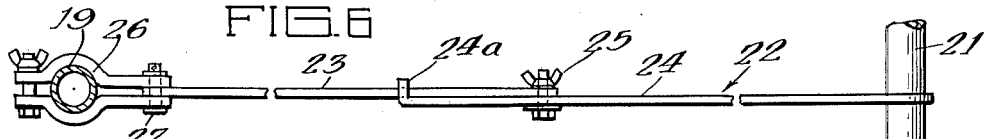
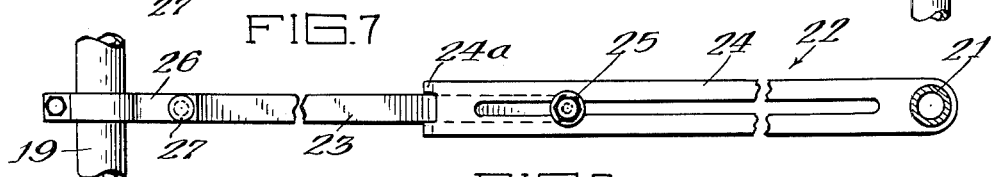
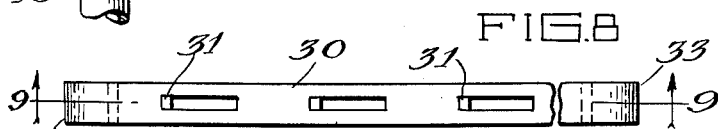
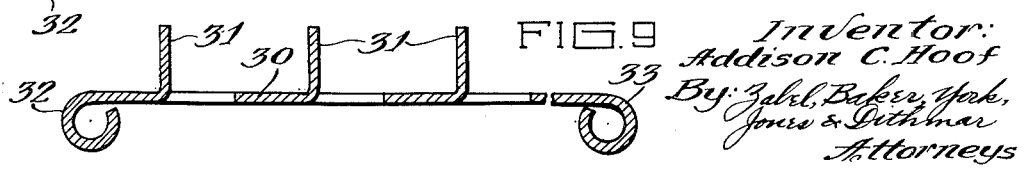
Inventor:
Addison C. Hoof

United States Patent Office 3,064,992
Patented Nov. 20, 1962

3,064,992
UTILITY CARTS WITH ARTICLE SUPPORTING RACKS
Addison C. Hoof, Hinsdale, Ill., assignor to Hoof Products Company, Chicago, Ill., a corporation of Illinois
Filed Mar. 31, 1960, Ser. No. 19,005
8 Claims. (Cl. 280—79.3)

This invention relates to improvements in utility carts such as those adapted for use in manufacturing estalishments for transporting work pieces from place to place.

It is an object of my invention to provide a utility cart in which the work supporting portion is in the form of a rack which can be arranged at different angles and elevations so that it is adaptable for a wide variety of uses.

A specific feature of my invention is that the rack does not have any separate frame portion, the rack strips themselves and a portion of the cart structure cooperating with a bottom cross member of the rack to constitute a hingedly mounted rack. Thus two oppositely disposed racks can be hingedly mounted on the same structural member of the cart.

Another object is to provide a utility cart in which the rack portion can be cantilevered out over a work bench to serve as a bench rack so that the parts or work pieces being operated on by the operator can be placed, at the conclusion of each manufacturing operation, directly on the rack with a minimum amount of effort. Then when the rack is filled, the cart can be moved along to the next operator.

Another object is to provide a utility cart having an improved work supporting rack which is of universal utility in supporting work pieces and parts of different sizes and shapes.

Since the work pieces or parts in manufacturing operations are frequently of irregular shape, it often happens that a special rack is constructed for supporting each particular type of work piece. However, I have found that where the rack is in the form of two or more rack strips, each having a series of pegs therein, that by mounting the rack strips for longitudinal adjustment, it is possible to accommodate the great majority of the irregular shapes that are encountered in small manufacturing operations. Also, the adjustability of the rack strips also accommodates the racks to work pieces of widely different dimensions.

A still further object is to provide a utility cart in which the base portion of the cart structure is adjustable according to different load conditions.

Other objects, features and advantages will become apparent as the description proceeds.

With reference now to the drawings in which like reference numerals designate like parts:

FIG. 1 is an end elevation of a preferred embodiment of my invention;

FIG. 2 is a similar view showing the parts in a changed position;

FIG. 3 is an enlarged vertical section taken along line 3—3 of FIG. 1;

FIG. 4 is an enlarged plan section taken along line 4—4 of FIG. 1;

FIG. 5 is a side elevation of FIG. 1;

FIG. 6 is a plan view along lines 6—6 of FIG. 1;

FIG. 7 is an elevation of FIG. 6;

FIG. 8 is a plan view of a rack strip; and

FIG. 9 is a vertical section along line 9—9 of FIG. 8.

With reference now to FIGS. 1 and 5, the utility cart comprises a cart structure 10 and a rack assembly 11. The cart structure comprises a rectangular base frame 12 and a rectangular vertical frame 13 which are suitably secured to each other as by the K-fitting 14. Casters 15 are provided at the corners of the base frame 12.

The rack assembly 11 comprises two racks 16 and 17 and a pair of supports 18 which are telescopically received within the tubular uprights 19 of the vertical frame 13 in order to provide a pair of adjustable standards. A tubular cross piece 20 connects the upper ends of the supports 18. Pins 28 regulate the extension of the telescopic standards 18, 19.

Each rack comprises the cross piece 20, a bottom cross member 21, struts 22, and a plurality of rack strips 30 which extend between the cross piece 20 and the bottom cross member 21.

As shown in FIGS. 6 and 7, the strut 22 is adjustable in length and comprises two halves 23 and 24 which are slidably associated with each other, together with a suitable bolt and wing nut arrangement 25 for clamping the two halves in their adjusted position.

The inner end of the strut half 24 is provided with bent up fingers 24a which embrace the sides of the strut half 23 so that the two strut halves 23 and 24 will be restrained from buckling when the racks are heavily loaded. At other times, however, the fingers 24a may be disengaged from the strut half 23, as shown in FIG. 1, to the end that the strut may be buckled or collapsed incident to the disposition of the rack 17, for example, in a vertical position.

The inner end of the strut is provided with a clamp 26 which engages the upright 19, the strut and the clamp being connected by a pivot 27.

Thus, the rack 16 may be maintained in various angular positions, ranging from the vertical position of rack 17, as shown in FIG. 1, to the projecting position of rack 16, as shown in FIG. 1.

The rack strips 30 are provided with a plurality of pegs 31 which, as shown in FIGS. 8 and 9 are in the form of struck up lugs. The upper and lower ends of the rack strips 30 are formed into loops 32 and 33 which surround the cross piece 20 and a bottom cross member 21 respectively. The longitudinal position of the rack strips is adjustable so that the rack may be arranged to conform with the size and shape of the work pieces or parts to be supported thereby, the pegs 31 serving to engage the articles supported.

In the practice of my invention, the loops preferably engage the elements 20 and 21 sufficiently tightly so that the rack strips tend to retain their adjusted position, but not tightly enough so that the longitudinal position cannot be adjusted readily by hand or by tapping with a hammer. The rack strips are desirably formed of a half hard steel so that the degree of tightness of the loops 32 and 33 can readily be regulated to suit the conditions of adjustment encountered. Also, when made of half hard steel, loops can be opened up to remove a particular rack strip, when desired, or the pegs 31 can be bent back into their openings 34 in instances where a particular peg interferes with the article which is being supported by another peg.

The relative ease with which rack strips may be removed or replaced permits the use of a single cross piece 20 which is common to both of the racks 16 and 17. In situations where the shape of the work pieces to be supported requires an irregular spacing of the rack strips on each of the racks such that the alternating arrangement shown in FIG. 5 cannot be readily accommodated to the particular use, it is a simple matter to remove and replace a few of the rack strips in order to provide the desired longitudinal spacing of rack strips for each of the two racks.

As shown in FIG. 4, the K-fitting 14 preferably is slidably mounted on the end members 35 of the rectangular base frame 12. A set screw 36 is provided in order to lock the K-fitting 14 and the vertical frame 13 in the desired position. For instance, the vertical frame 13 and the racks may be centered with respect to the base frame 12, as diagrammatically shown in FIG. 2 or it may be disposed closer to one side as shown in FIG. 1.

One use for the utility cart as previously indicated, is to provide a bench rack in which one of the racks can be cantilevered out over a work bench. In this situation, the offset position of the parts shown in FIG. 1 may be preferred both for reasons of stability, and also to avoid a situation in which the left hand end of the base frame 12 would project out into the aisle. Also, the loading capacity can be considerably increased where the vertical frame 13 is close to the casters, since this reduces the beam flexure of the end members 35 which is at its maximum when the parts are in the centered position of FIG. 2.

On the other hand, in other applications the centered position is preferred, especially when both racks are loaded.

Although only a preferred embodiment of the present invention has been described herein, it will be understood that various modifications and changes may be made in the construction shown without departing from the scope of the invention as pointed out in the appended claims.

I claim:

1. A utility cart for use in transporting work pieces from place to place comprising a supporting frame, casters for said supporting frame, said supporting frame including a pair of standards, and a tubular cross piece connecting the upper ends of said standards, a pair of racks hingedly mounted on opposite sides of said tubular cross piece, each of said racks comprising a bottom cross member, a plurality of rack strips hingedly connecting each of said bottom cross members with said tubular top piece, and a plurality of pegs projecting outwardly from each of said rack strips, the rack strips of one rack being staggered with the rack strips of the other rack so that said top cross piece is common to both of said racks, and strut means extending between each of said lower cross members and said standards for maintaining each of said racks in an angularly inclined position.

2. A utility cart as claimed in claim 1 in which said rack strips are slidably mounted on said tubular top piece and said bottom cross members.

3. A utility cart as claimed in claim 1 in which the length of said strut means is adjustable.

4. A utility cart as claimed in claim 1 in which the ends of said rack strips are formed into loops, one loop surrounding said tubular cross piece, and the other loop surrounding one of said bottom cross members.

5. A utility cart as claimed in claim 4 in which said rack strips are fabricated from half hard steel so that said loops may be opened up and said rack strips removed.

6. A utility cart as claimed in claim 1 in which said rack strips are fabricated from strip stock, and in which said pegs comprise lugs which are struck up from each of said rack strips.

7. A utility cart as claimed in claim 1 in which said standards are telescopic so that the elevation of said racks can be adjusted.

8. A utility cart as claimed in claim 1 in which said supporting frame includes a horizontally disposed base frame, said standards being slidably mounted on said horizontally disposed frame for horizontal movement in a direction perpendicular to the orientation of said tubular cross piece.

References Cited in the file of this patent

UNITED STATES PATENTS

| | | |
|---|---|---|
| 1,090,687 | Coon | Mar. 17, 1914 |
| 1,345,344 | Blandford | July 6, 1920 |
| 1,572,260 | Wright et al. | Feb. 9, 1926 |
| 2,175,981 | Vining | Oct. 10, 1939 |
| 2,401,881 | Petsche | June 11, 1946 |
| 2,616,571 | Griffin | Nov. 4, 1952 |
| 2,626,711 | Saul et al. | Jan. 27, 1953 |
| 2,754,889 | Lovelace | July 17, 1956 |
| 2,885,090 | Forman et al. | May 5, 1959 |

FOREIGN PATENTS

| | | |
|---|---|---|
| 710,420 | Germany | Sept. 12, 1941 |